United States Patent
Axnix et al.

(10) Patent No.: US 7,194,616 B2
(45) Date of Patent: Mar. 20, 2007

(54) FLEXIBLE TEMPORARY CAPACITY UPGRADE/DOWNGRADE IN A COMPUTER SYSTEM WITHOUT INVOLVEMENT OF THE OPERATING SYSTEM

(75) Inventors: Christine Axnix, Steinenbronn (DE); Klaus-Jurgen Kuebl, Stuttgart (DE); Andreas Muehlbach, Bondorf (DE); Juergen Josef Probst, Wildberg (DE); Carl J. Hollenback, Jessup, PA (US); Jeffrey P. Kubala, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 10/280,706

(22) Filed: Oct. 25, 2002

(65) Prior Publication Data

US 2003/0120914 A1 Jun. 26, 2003

(30) Foreign Application Priority Data

Oct. 27, 2001 (EP) .................................. 01125735

(51) Int. Cl.
*G06F 9/00* (2006.01)
(52) U.S. Cl. ..................... 713/100; 718/104; 714/11
(58) Field of Classification Search ............... 709/215, 709/229; 713/1, 100, 191; 718/1, 100, 104; 712/29; 714/11, 12; 711/153, 163, 173
See application file for complete search history.

(56) References Cited

U.S. PATENT DOCUMENTS

| | | | | |
|---|---|---|---|---|
| 5,872,963 A | * | 2/1999 | Bitar et al. | 712/233 |
| 6,195,750 B1 | * | 2/2001 | Ellsworth | 713/100 |
| 6,633,916 B2 | * | 10/2003 | Kauffman | 709/229 |
| 6,931,640 B2 | * | 8/2005 | Asano et al. | 718/104 |

* cited by examiner

*Primary Examiner*—Van Nguyen
(74) *Attorney, Agent, or Firm*—William A. Kinnaman, Jr.

(57) ABSTRACT

According to the present invention a method and a device is provided for concurrent removal of processor capacity from a running computer. The method and device may, e.g., be used for non-disruptive removal of processors from the enabled physical configuration without any involvement of the operating system. The computer comprises a resource controller configured to control a physical resource pool including the actual physical resources and a capacity virtualizer configured to provide multiple sets of virtual resources from a capacity virtualizer resource pool, whereby the provided sets of virtual resources allow to host independent operating systems concurrently. The method comprises the steps of the resource controller requesting the capacity virtualizer to reduce the capacity virtualizer resource pool, the capacity virtualizer removing resources from the capacity virtualizer resource pool, and the resource controller disabling physical resources corresponding to the resources removed from the capacity virtualizer resource pool.

9 Claims, 4 Drawing Sheets

FLEXIBLE TEMPORARY CAPACITY UPGRADE/DOWNGRADE IN A COMPUTER SYSTEM WITHOUT INVOLVEMENT OF THE OPERATING SYSTEM

BACKGROUND OF THE INVENTION

The present invention generally relates to a method and device for flexible temporary capacity upgrade of a computer system. Particularly, the present invention relates to a method and device for non-disruptive reduction of capacity provided by a computer system and to the enabling of the temporary upgrade for a predefined total of time within a predefined period of time.

The capacity, also called performance, of a computer system in terms of throughput and response times depends on its hardware and the software running on the hardware. The hardware capacity mainly depends on the performance of the one or more processors being present in the computer system, the number of processors and the efficiency of their cooperation, the size and access rates of the main storage, and the I/O bandwidth and its latencies. Such structure of a computer system comprising the processors, the respective cache infrastructure, and the I/O connection infrastructure may be referred to as the Central Electronic Complex (CEC).

In business software licensing is often based on the overall capacity of such a Central Electronic Complex (CEC). By adding or removing processors the CEC capacity may be changed. Software can recognize the CEC performance by different methods. It may directly retrieve the capacity indicators from the hardware via special instructions or it may just count it out in some short spin loops. According to the specific license agreement software may be limited to execute up to a predefined CEC capacity level, or royalties may be charged in accordance with the recognized actual CEC capacity.

Under such circumstances the customer seeks to minimize the amount of software license royalties by enabling CEC capacity appropriate to the customer's actual needs. This is especially important for capacity backup computer centers with much dormant capacity installed, just waiting to be enabled in case of a disaster, e.g., the total breakdown of a primary computer center. Such systems run at medium, low, or even very low CEC capacity, called the enabled capacity. The disabled (dormant) capacity may by far exceed the enabled capacity. For big installations the CEC capacity driven software license fee for a computer center may be multiple millions of dollars a year, exceeding the cost of the dormant hardware.

In order to support such customer needs, special hardware offerings are provided that allow for concurrent upgrade of CEC capacity, i.e., an upgrade of CEC capacity without interrupting the normal operation of the computer system. In order to facilitate a concurrent upgrade special interfaces have to be provided to make the hardware inform the software about increasing or decreasing CEC capacity. For disaster recovery it is mainly important that the upgrade (addition of processors) can be handled concurrently by hardware and by software. However, to ensure proper disaster recovery, periodical disaster recovery tests must be performed to verify hardware, software, and the overall disaster recovery procedures. This introduces the importance of concurrent reduction of CEC capacity. Any reduction of CEC capacity, especially by removing processors (disabling of physical processors) from the active configuration, usually requires dedicated involvement of the operating system. Removal of processors without involvement of the operating system may impact transactions, cause failure of software subsystems, or even result in a failure of the complete software system (operating systems with middle ware and applications).

As it is known to a person skilled on the art, computer systems comprise hardware and software. The hardware is usually called the 'Computer' including all the hardware entities while the software comprises operating system, middle ware, e.g., a data base systems, and application programs. The boundary between hardware and software is called the architecture level. The functionality furnished by the underlying hardware may therefore be called architecture. Hence, the architecture must be provided by the hardware and the binary software must comply to this architecture to be able to run on the respective hardware.

A particular piece of hardware, herein called 'capacity virtualizer', is able to 'virtualize' hardware resources. It may, e.g., be able to split the performance of a single physical processor into multiple logical processors. An example for such a Capacity virtualizer is the IBM zSeries 900 Logical PARtition facility (LPAR). For background information refer to U.S. Pat. No. 5,564,040 by Kubala, assigned to International Business Machines Corporation, Armonk, N.Y., US, filed 8 Nov. 1994, issued 8 Oct. 1996, "Method and Apparatus for Providing a Server Function in a Logically Partitioned Hardware Machine", which describes aspects of logical partitioning. (The LPAR hypervisor is typically referred to as the "LPAR manager". More detailed reference material can be found in IBM zSeries 900 Processor Resource/Systems Manager™ (PR/SM™) Planning Guide, SB10-7033-00, March 2001.)

A Capacity virtualizer is configured to provide multiple sets of virtual resources which allow to host multiple independent operating systems concurrently. A set of virtual resources can be seen as a virtualized part of the total computer system hardware providing all types of resources required to run an operating system, e.g., processor, memory and I/O. Consequently, it is herein called a 'Virtual Computer'. Logical Processors are provided to the Virtual Computers (actually to the operating system running on a Virtual Computer) and the capacity of the processors is controlled by the virtualizer per Virtual Computer. By this the virtualizer is able to provide many more logical processors in total than physical processors are enabled.

Certain hardware, e.g., S/390 or zSeries enterprise servers by International Business Machines Corporation, Armonk, N.Y., US, uses Licensed Internal Code (LIC) executing dispatch algorithms for providing 'logical' processors from a pool of 'physical' processors, other hardware may use different approaches. LIC, sometimes also called 'firmware', is considered hardware not software because it runs below the architecture level and is part of the hardware shipment, like firmware in automobiles, washing-machines, or television sets.

Secure control over the enabled and the disabled (dormant) capacity can be done using mechanisms based upon cryptography e.g. like described in the patent U.S. Pat. No. 5,982,899 by Jürgen Probst, assigned to International Business Machines Corporation, Armonk, N.Y., US, filed 11 Aug. 1995, issued 9 Nov. 1999, "Method for Verifying the Configuration of the Computer System."

Utilization of the above capabilities for concurrently, non-disruptively increasing the processor capacity of a computer is state of the art (e.g. IBM zSeries). In most cases this is sufficient since computers are usually upgraded, rather than downgraded, e.g. the number of enabled physical processors is increased. However, as mentioned above backup computer centers must periodically test the disaster recovery procedures. This does not only require concurrent (non-disruptive) upgrade of processor capacity but also requires concurrent reduction of processor capacity after the test is completed.

SUMMARY OF THE INVENTION

An object of the present invention is to provide a method and a device that facilitates a concurrent removal of processor capacity from a running computer system.

According to the present invention a method and a device is provided for concurrent removal of processor capacity from a running computer. The method and device may, e.g., be used for non-disruptive removal of processors from the enabled physical configuration without any involvement of the operating system. The computer comprises a resource controller being configured to control a physical resource pool including the actual physical resources and a capacity virtualizer being configured to provide multiple sets of virtual resources from a capacity virtualizer resource pool, whereby said provided sets of virtual resources allow to host independent operating systems concurrently. The method comprising the steps of said resource controller requesting said capacity virtualizer to reduce said capacity virtualizer resource pool, said capacity virtualizer removing resources from said capacity virtualizer resource pool, and said resource controller disabling physical resources corresponding to the resources removed from said capacity virtualizer resource pool.

According to the present invention the new capabilities, i.e., the non-disruptive removal of processor capacity, gets implemented in pure hardware. This advantageously removes any need to implement support in multiple operating systems, e.g., IBM zSeries running VSE, VM, z/OS, Linux, and derivatives as operating systems. According to the present invention the Capacity virtualizer reduces the capacity of the logical processors according to the reduction of the number of enabled physical resources, such as processors, memory and I/O. Thus, it doesn't matter whether a single operating system type is used with the respective hardware architecture involvement or different operating systems are used for a certain hardware architecture. None of those operating systems need to be enabled to cooperate with the hardware to allow the capacity downgrade.

Furthermore, according to the present invention one or more Virtual Computers are operated with the required number of logical processors and stay unchanged with this number during capacity upgrade and capacity downgrade. Hence, the logical processors just appear to the operating system, running on the Virtual Computer, with changing capacity.

Additional overhead caused by allowing more logical processors per Virtual Computer than physical processors should not be an issue, since in a capacity back-up configuration the machine is running at comparable low capacity anyhow. However, once the additional physical resources are added to the configuration, any Virtual Computer can instantly make use of that added capacity because the Capacity virtualizer will dispatch the logical processors from the larger pool of physical processors. Consequently, when physical processors are removed from the pool, the Capacity virtualizer will then dispatch from the smaller resource pool.

In addition, this invention does not preclude the capability of having software in a Virtual Computer that understands how to configure logical processors online and off-line. In fact, when the subject matter of the present invention is being used in conjunction with the 'CPU management aspects of the Intelligent Resource Director' (embodied in several pending U.S. Patent applications including Ser. No. 09/407,391, filed Sep. 28, 1999 now U.S. Pat. No. 7,007,276, the Workload manager running on a Virtual Computer (IBM zSeries logical partition) can automatically adjust the number of online and offline logical processors in the virtual computer in order to optimize the changed capacity of the machine, thus minimizing the number of currently online logical processors to accomplish its work.

According to a further aspect of the present invention the ability of concurrent capacity upgrade and downgrade is employed to facilitate a temporary capacity upgrade for a given computer system. This may be realized in terms of temporary capacity upgrades, like a predetermined or adjustable number of time slices (e.g. hours or days) for the temporary capacity upgrade, also called credit in the following.

A capacity planner facility controlled by human intervention or another automatic tool may initiate a request for temporary upgrade to the system hardware. This may be done via the hardware console or through the operating system. In case it is done through the operating system it would just be the transport vehicle for the request. The operating system would not recognize the request type (temporary capacity upgrade) itself. A piece of hardware, a so called 'resource controller' being part of the hardware, enables additional physical resources, such as processors, as defined in the request. For asset protection purposes the resource controller may compare the upgrade request against capacity data sets defining the enabled amount of physical resources. Capacity data sets may be protected via encryption as suggested by U.S. Pat. No. 5,982,899 (cf. above). Also the request may not explicitly describe the number of processors but just refer to Capacity data sets. The Capacity virtualizer takes the additional processors into its pool and provides the increased overall capacity to the Virtual Computer(s) hosting the operating system(s).

The same approach as described above is not limited to processors, but it can be used for all kinds of shared physical resources, e.g. input/output adapters providing virtualized input/output paths.

BRIEF DESCRIPTION OF THE DRAWINGS

These and other objects will be apparent to one skilled in the art from the following detailed description of the invention taken in conjunction with the accompanying drawings in which.

DESCRIPTION OF THE PREFERRED EMBODIMENT

Figure 1:
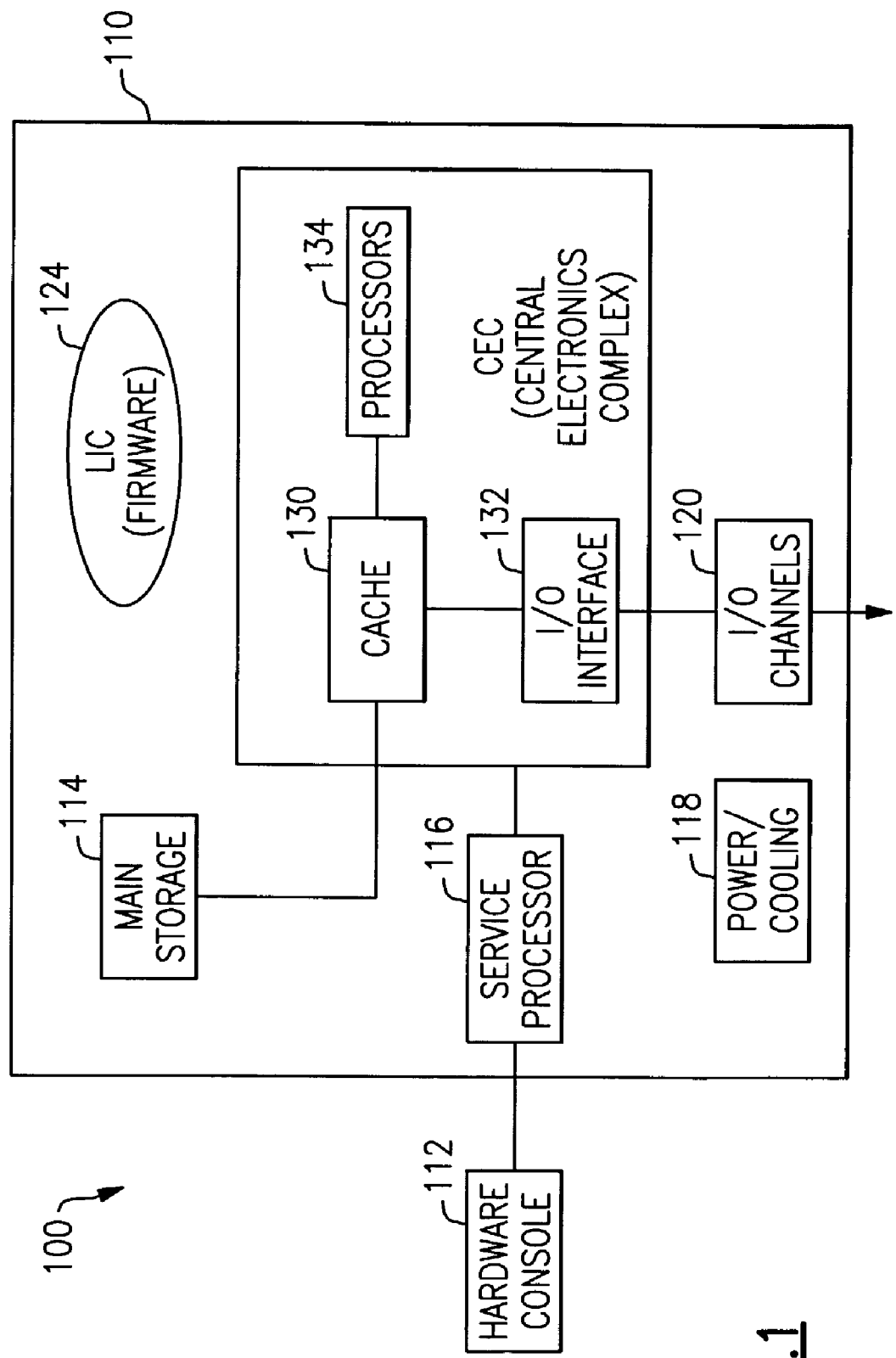
FIG. 1 shows a block diagram of a hardware configuration on which the subject matter of the present invention may be implemented.

Referring to the drawings, and more particular to FIG. 1, there is shown a hardware configuration 100 on which the subject matter of the present invention may be implemented, e.g., an IBM zSeries 900 enterprise server or a SUN UE 10000 mainframe. The hardware configuration includes a computer 110 and a hardware console 112. The computer 110 comprises a main storage 114, a service processor 116, a power supply and a cooling devices 118, I/O (input/output) channels 120, a Central Electronics Complex (CEC) 122 and a LIC module (Licensed Internal Code, also called firmware) 124. The CEC includes a cache 130, an I/O interface 132 and one or more physical processors 134.

As shown in FIG. 1, the hardware console 112 is connected to a service processor 114 which is part of the computer 110. The connection between the service processor 114 and the hardware console 112 may be realized by a commercial communication link as known in the art, such as Token Ring or Ethernet. The service processor provides access to the functions and circuitry within the CEC 122.

The Power supply and the cooling devices 118 are drawn in one block purely for the sake of clarity. It is acknowledged that those devices may be implemented as separate devices. Both devices provide part of the infrastructure to allow the computer system to operate.

The I/O channels 120 may be formed by one or more I/O adapters as generally provided and known in the art. The I/O channels may be connected to disks, tapes, terminals, LANs (Local Area Networks), printers or other I/O devices or I/O subsystems.

The Licensed Internal Code module 124 may run on one or more of the processors for internal purposes, e.g., to communicate with the hardware console or to implement complex instructions, such as STSI (STore System Information).

In terms of resources the hardware configuration 100 provides processor capacity, storage, and I/O paths. The overall processor capacity is mainly determined by the number of processors, the performance of a single processor, cache size and cache access efficiency. Therefore, it is also called CEC capacity. The main storage 114 provides space for storing the instructions (programs) and the data.

Figure 2:
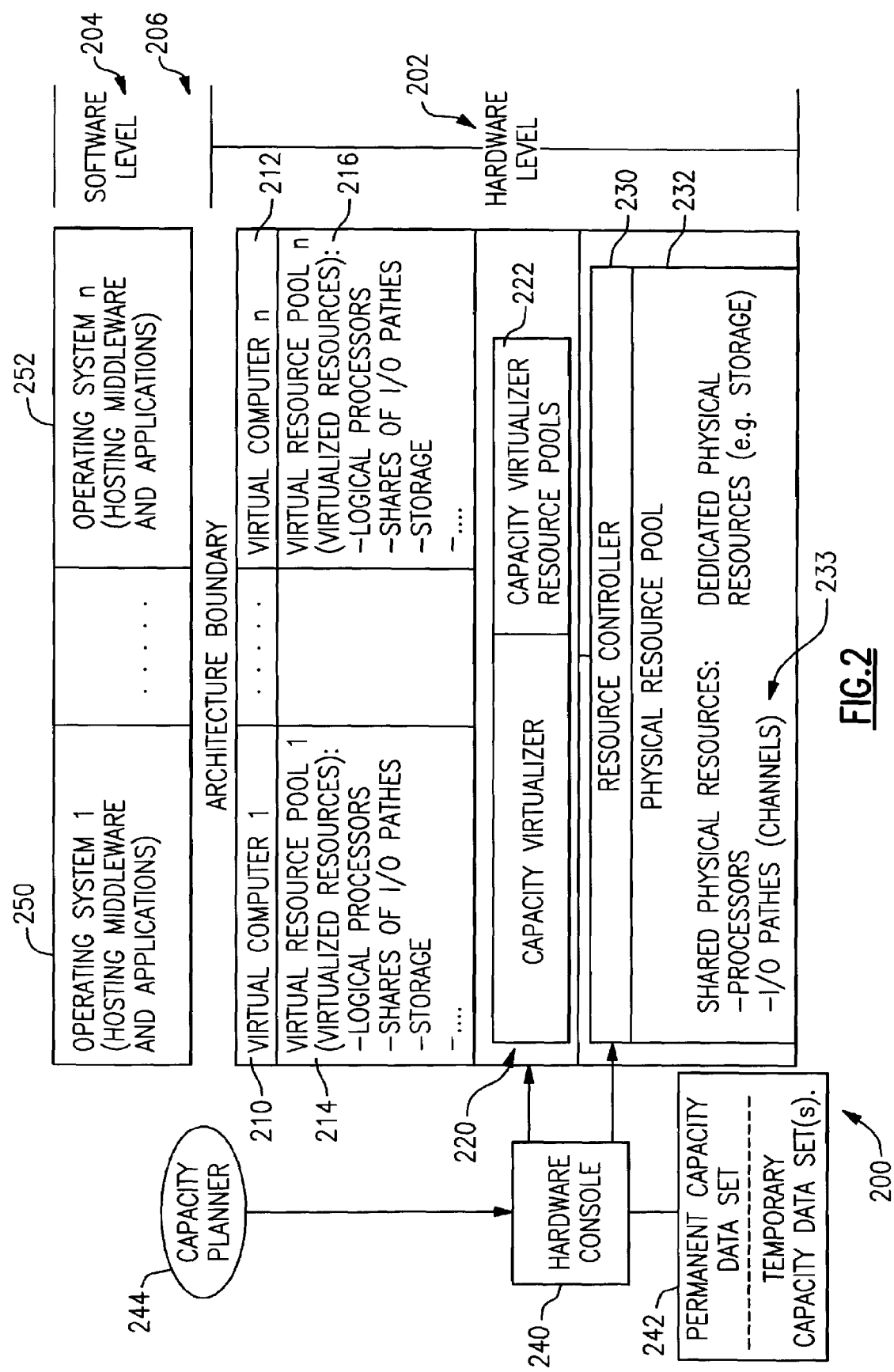
FIG. 2 shows a block diagram providing a logical view of a computer system with software level and hardware level separated by the architecture boundary.

While FIG. I focuses on the physical entities, i.e., the hardware of the computer system (also commonly called 'the computer'), FIG. 2 illustrates the logical view of a computer system 200 to be used with the present invention including a computer as denoted by a hardware level 202, and software as denoted by a software level 204. The boundary between the hardware level 202 and the software level 204 is defined as the 'architecture' of the computer as denoted by a architecture boundary 206. The hardware level 202 comprises one or more virtual computers 210, 212, whereby the number of virtual computers may only be limited by the overall performance capability of the underlying hardware configuration. A virtual resource pool 214, 216 is associated to each of the one or more virtual computers 210, 212. The virtual resource pools 214, 216 include all virtualized resources, such as logical processors, shares of I/O paths and storage.

The virtual computers 210, 212 and the respective virtual resource pools 214, 216 are established on top of a capacity virtualizer 220 that governs a capacity virtualizer resource pool 222. Below the capacity virtualizer 220 a resource controller 230 is formed that controls a physical resource pool 232 comprising the actual physical resources 233. The physical resources 233, however, are grouped in a first group of shared physical resources and dedicated physical resources. The shared physical resources include processors and I/O paths, whereas the dedicated physical resources comprise storage devices.

A hardware console 240 is provided for allowing control of the capacity virtualizer 220 and the resource controller 230. The hardware console 240 is connected to a storage unit 242 in which either a permanent capacity set or a temporary capacity set or both are being stored. From the software level the hardware console may be controlled by a capacity planner 244.

On top of the hardware level 202, above the architecture boundary 206 the software level is formed including one or more operating systems 250, 252. The operating systems 250, 252 host middle ware and application programs. Generally, one operating system is running in each of the one or more virtual computers 210, 212.

The architecture basically defines a set of (binary) instructions which the computer can execute. Most computers provide their total resources at the architecture level to a single operating system that controls the resources and provides them to the application programs. However, a computer, as illustrated in FIG. 2, may contain a Capacity virtualizer 210, e.g., LPAR hypervisor on IBM zSeries 900, which may be implemented in LIC or in electronic circuits or in a mixture of both.

The capacity virtualizer 220 works as a logical function that splits up the physical resources 233 into multiple sets of virtual resources comprising a virtual computer. As aforementioned two types of resources are distinguished, namely, resources like processor capacity that can be shared and resources like storage, that can only be dedicated to a particular virtual computer. The capacity virtualizer 220 dedicates storage to the virtual computers 210, 212 but collects processor capacity and I/O path bandwidth in its capacity virtualizer resource pools 222. In the capacity virtualizer resource pools specialized processor capacity pool and I/O path pools may be formed.

For shared resources the capacity virtualizer 220 may provide any amount of capacity shares to the virtual computers, whereas dedicated resources can only be provided in physical or logical units, e.g., bytes, words, cache line sizes, or pages of storage. The virtual computers 210, 212 may be loaded with independent operating systems hosting middle ware and application software. It should be noted that each of the virtual computers 210, 212 is independent of any of the other virtual computers 210, 212 like different physical computers in separate boxes.

The resource controller 230 has control over all the physical resources 233 of the computer. In a preferred embodiment of the present invention the resource controller runs on the CEC (cf. FIG. 1), however, it may also partially or completely run on the hardware console 240. It receives data from the hardware console 240 containing capacity data sets defining the amount of resources to be enabled. For asset protection purposes capacity data sets may be protected via encryption as suggested by U.S. Pat. No. 5,982, 899 (cf. above). This may happen during system initialization, but changes (updates) may be sent to the resource controller 230 at any time during operation, as well. The resource controller 230, then, changes the enabling of the physical resources 233 accordingly.

There may be different data on the permanent and the temporary enabling. There is only one permanent set at a time in the configuration and it defines the basic amount of physical resources 233. There may be multiple temporary sets for different purposes stored in the configuration at the same time, e.g., one for Emergency Backup/Disaster Recovery and another one for Try and Buy. They may define different periods of credit applying to different amounts of resources.

While the resource controller 230 controls the enabling of the physical resources 233 it does not care about splitting them up for usage by different virtual computers 210, 212. This is done by the capacity virtualizer 220 as described above. However, the capacity virtualizer 220 can never exploit more physical capacity than the resource controller 230 has enabled.

The capacity planner 244 may be a human being or an automated process with access to the hardware console 240. The access method may use direct intervention to the hardware console or may work through other paths, even utilizing a path through the computer would not be excluded, as long as it is a secure end to end connection. Via this path the capacity planner 244 tells the hardware console what resource enabling data set(s) are to be sent to the resource controller 230. The same path from the capacity planner may be used to instruct the capacity virtualizer 220 about the capacity shares to be provided to each of the virtual computers 210, 212. However, it is possible to use different paths as well, such as directly from one of the operating systems 250, 252 via the respective virtual computer 210, 212 directly to the capacity virtualizer 220.

It should be noted that in the context of the present invention there is a strong separation between the authorities of the capacity virtualizer 220 and the resource controller 230. While the resource controller 230 controls the amount of enabled physical resources 233, the capacity virtualizer 220 is able to change the amounts of shared resources provided to the virtual computers 210, 212 concurrently, i.e., without disruption and without any cooperation of the virtual computers 210, 212 and the software, e.g., the operating systems 250, 252, running on those virtual computers 210, 212.

Figure 3:
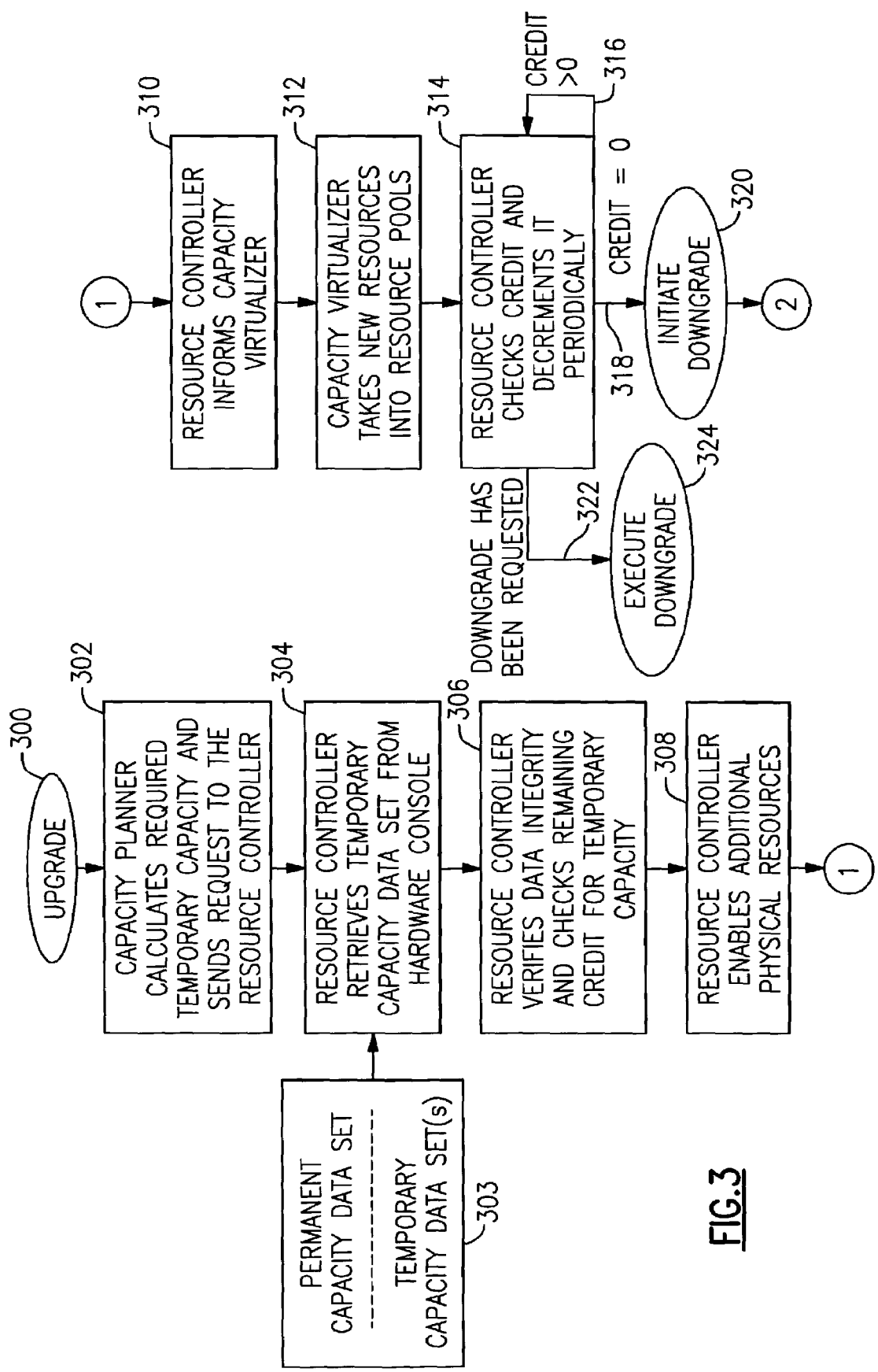
FIG. 3 shows a flow diagram illustrating the method for the concurrent upgrade.
Figure 4:
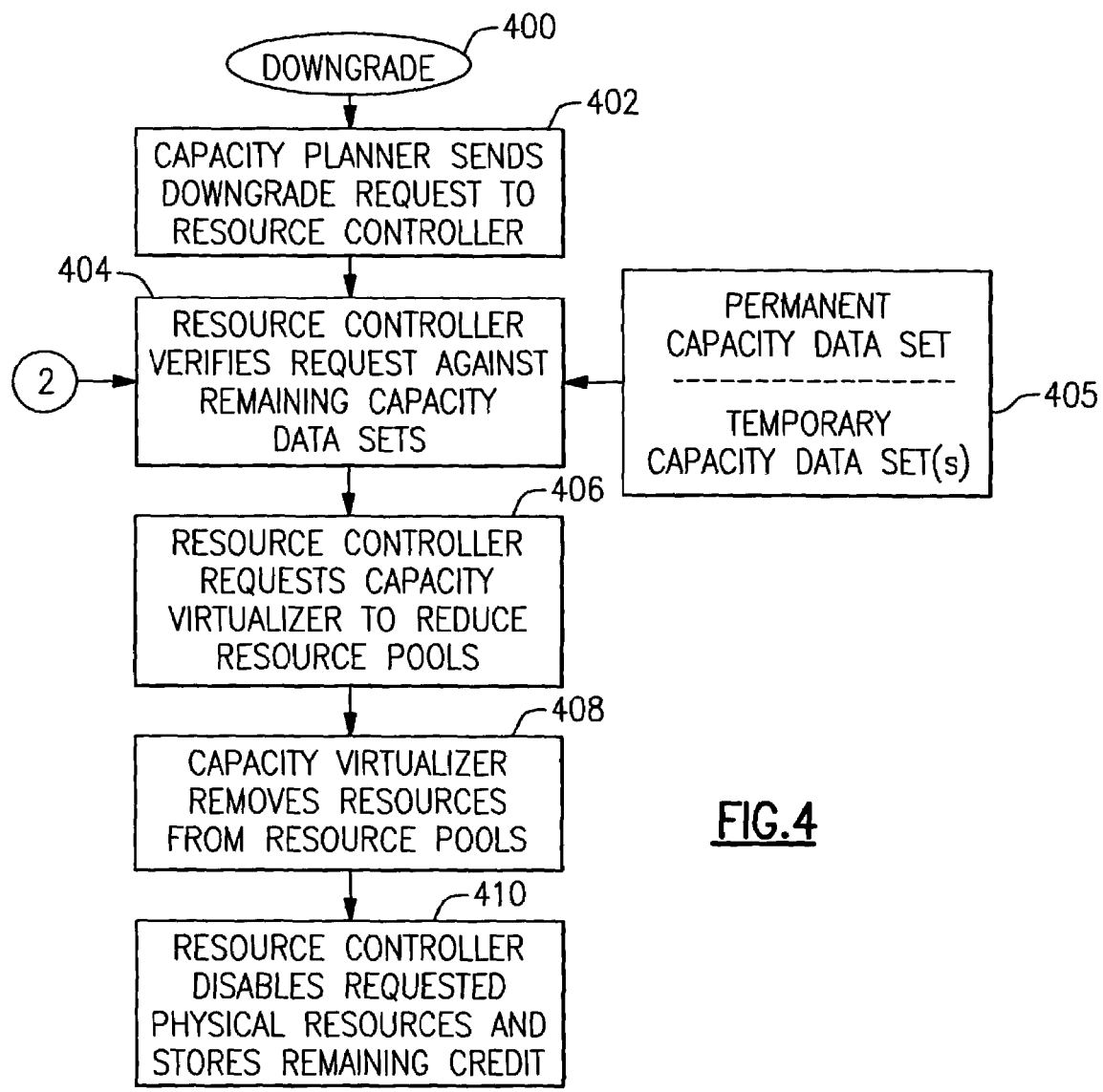
FIG. 4 shows a flow diagram illustrating the method for the concurrent downgrade in accordance with the present invention.

Now with reference to FIGS. 3 and 4, the flow charts in FIG. 3 and FIG. 4 and the accompanying description assume a running system, because the invention relates to actions in a running system with a permanent set of resources enabled. FIG. 3 illustrates a capacity upgrade (block 300). It is assumed that data set(s) for temporary addition of resources are available in the hardware console storage unit as explained with reference to FIG. 2.

The capacity planner calculates the amount of additional resources required to fulfill the expected capacity requirements and sends the request to the resource controller (block 302). In response, the resource controller retrieves the respective data set from the hardware console (block 303, 304), verifies the integrity of the data and checks the remaining credit. 'Credit' designates the amount of time the temporary resource data set is valid for (block 306). It may be defined in time slices, e.g., minutes, hours, days, and/or specify the number of upgrade cycles or an expiration date. The initial credit is defined when the temporary enabling is bought by the customer.

On successful verification the resource controller enables the additional resources as specified (block 308). This action may include initialization of the respective entities, e.g., processors or I/O channels. Then the resource controller informs the capacity virtualizer about the additional resources (block 310). This may be done via an interruption mechanism or some other means. Now the capacity virtualizer integrates the new resources into its resource pools (block 312) and uses the increased resource pools for dispatching resources to the Virtual Computers.

Subsequently, the resource controller enters a state where it controls the credits (block 314). In case of time slice credits, e.g., minutes, hours, days, it decrements the credit of the respective data set. Also it checks for a potential expiration date. It remains in this state as long as there is credit available and no downgrade, i.e., an undo of temporary upgrade, is initiated (arrow 316). When the credit is exhausted the resource controller initiates the downgrade by its own (arrow 318, block 320). In the state illustrated with block 314 a downgrade may be requested at any time (arrow 322). Then, a downgrade is executed (block 324).

Like described above for a single temporary capacity data set the system may also use multiple temporary capacity data sets at the same time. In this case the capacity planner and the resource controller have to keep track about respective IDs of the data sets.

With reference to FIG. 4, there is depicted a flow diagram illustrating the method for the concurrent downgrade in accordance with the present invention. As aforementioned the downgrade (block 400) may be initiated either on request, or automatically when there is no credit left.

The downgrade path at the end of the temporary upgrade period is also initiated by the capacity planner and like for the upgrade.

The capacity planner (cf. FIG. 2) sends a downgrade request to the resource controller (block 402). In order to ensure that the requested target configuration matches the remaining enabled capacity data sets, the resource controller verifies the request against the current configuration and the remaining enabled capacity data sets (block 404), whereby the information about the permanent and temporary capacity data set(s) is taken from the storage unit connected to the hardware console (block 405). In the case of a single permanent and a single temporary capacity data set, the permanent capacity data set is the only remaining enabled capacity data set.

On match the resource controller requests the capacity virtualizer to remove the respective amount of resources from its resource pools (block 406).

The capacity virtualizer removes the respective resources from its resource pools (block 408). Since the Capacity virtualizer virtualizes the resources that it provides to the virtual computers, it may reduce the amount of capacity without changing the number of resource entities. This occurs without disruption of the virtual computers and even without their cooperation. They just get the capacity of the various resource entities reduced. It is acknowledged that the same technique may be applied to all kinds of shareable resources, like processors and shared I/O paths.

Subsequently, the resource controller reduces the physical resources by disabling the requested amount of the respective physical resource entities (block 410). Finally, the resource controller stores the remaining credit for the respective temporary capacity data set. So it can be used for another temporary upgrade period until finally exhausted.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A computer-implemented method for concurrent removal of processor capacity from a computer while said computer is running, said computer having (1) a resource controller being configured to control a physical resource pool including actual physical resources and (2) a capacity virtualizer being configured to provide multiple sets of virtual resources from a capacity virtualizer resource pool, wherein each of said sets of virtual resources includes a defined number of virtual processors, whereby said provided sets of virtual resources allow hosting of independent operating systems concurrently, the method comprising the steps of:
   said resource controller receiving a downgrade request indicating which physical resources are to be disabled;
   said resource controller verifying said downgrade request against a capacity data set defining the amount of resources to be enabled;
   said resource controller, on verifying said downgrade request against said capacity data set, requesting said capacity virtualizer to reduce said capacity virtualizer resource pool;
   said capacity virtualizer removing resources from said capacity virtualizer resource pool by reducing the capacity of each virtual processor in a set while keeping the number of virtual processors in the set unchanged, and
   said resource controller disabling physical resources corresponding to the resources removed from said capacity virtualizer resource pool, said requesting, removing, and disabling steps being performed by said resource controller and said capacity virtualizer without involvement of said operating systems.

2. The method according to claim 1, further comprising the step of storing a remaining credit specifying the amount of time a resource is available for a temporary upgrade.

3. The method according to claim 1, further comprising said downgrade request being received through an interface that is external to said resource controller.

4. The method according to claim 1, further comprising said downgrade request being received through an interface implemented in at least one of said operating systems.

5. The method according to claim 1, further comprising the step of:
   enabling additional physical resource entities to the computer for a predefined total of time units within a predefined period of time without a need to change the number of resource entities provided to the operating system, said enabling step being performed before said requesting step.

6. The method according to claim 1, wherein the step of said resource controller requesting said capacity virtualizer to reduce said capacity virtualizer resource pool comprises determining in response to the computer that a temporary credit for the respective physical resources is exhausted.

7. The method according to claim 1 further comprising the step of providing a number of virtual processors to a particular set of virtual resources that is higher than the number of physical processors provided by said computer.

8. A computer program product for concurrent removal of processor capacity from a computer while said computer is running, said computer having (1) a resource controller configured to control a physical resource pool including actual physical resources and (2) a capacity virtualizer configured to provide multiple sets of virtual resources from a capacity virtualizer resource pool, wherein each of said sets of virtual resources includes a defined number of virtual processors, whereby said provided sets of virtual resources allow hosting of independent operating systems concurrently, said program product comprising;
   a computer usable medium;
   a computer readable program stored on said computer usable medium for causing a computer to perform the method of claim 1.

9. A device for concurrent removal of processor capacity from a computer while the computer is running having, the device comprising:
   a resource controller configured to control a physical resource pool including actual physical resources; and
   a capacity virtualizer configured to provide multiple sets of virtual resources from a capacity virtualizer resource pool, wherein each of said sets of virtual resources includes a defined number of virtual processors, whereby said provided sets of virtual resources allow hosting of independent operating systems concurrently;
   said resource controller receiving a downgrade request indicating which physical resources are to be disabled;
   said resource controller verifying said downgrade request against a capacity data set defining the amount of resources to be enabled;
   said resource controller, on verifying said downgrade request against said capacity data set requesting said capacity virtualizer to reduce said capacity virtualizer resource pool;
   said capacity virtualizer removing resources from said capacity virtualizer resource pool by reducing the capacity of each virtual processor in a set while keeping the number of virtual processors in the set unchanged; and
   said resource controller disabling physical resources corresponding to the resources removed from said capacity virtualizer resource pool, said requesting, removing, and disabling being performed by said resource controller and said capacity virtualizer without involvement of said operating systems.

* * * * *